United States Patent [19]

Ohtani

[11] 4,312,430
[45] Jan. 26, 1982

[54] SHOCK ABSORBER

[75] Inventor: Kuniji Ohtani, Chigasaki, Japan

[73] Assignee: Izumi Motor Co., Ltd., Tokyo, Japan

[21] Appl. No.: 102,831

[22] Filed: Dec. 12, 1979

[51] Int. Cl.³ .......................... F16F 7/12; B62D 1/10
[52] U.S. Cl. ...................................... 188/377; 74/492
[58] Field of Search ................. 188/1 C; 74/492, 493, 74/552; 293/133

[56] References Cited

U.S. PATENT DOCUMENTS 3,589,210 6/1971 Norman .................................. 74/552
3,908,478 9/1975 Barenyi .................................. 74/492
3,938,404 2/1976 Murase et al. ......................... 74/492
3,983,963 10/1976 Nakamura ............................. 293/133

4,123,948 11/1978 Zeller .................................... 74/492

Primary Examiner—Edward R. Kazenske
Attorney, Agent, or Firm—Fisher, Gerhardt, Crampton & Groh

[57] ABSTRACT

A shock absorber disposed between a steering wheel and a steering post, which comprises upper and lower holding rings to be coupled to hold the steering wheel and the steering post, respectively, and a plurality of supporting elements connected between the upper and lower holding rings. The upper and lower holding rings and the supporting elements form one substantially cylindrical unit, and the supporting elements are bent radially inwardly and outwardly to absorb an impact which may be caused during operating the vehicle.

5 Claims, 5 Drawing Figures

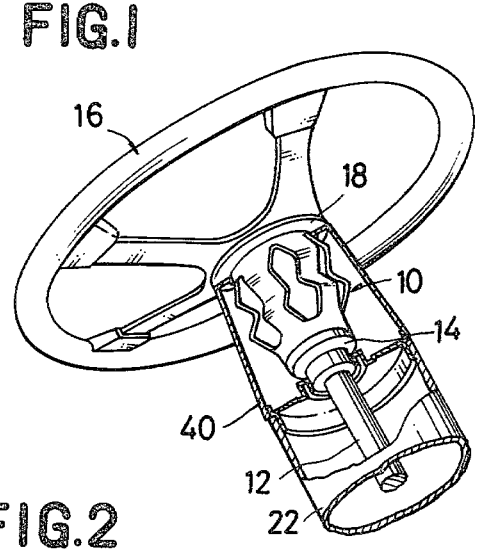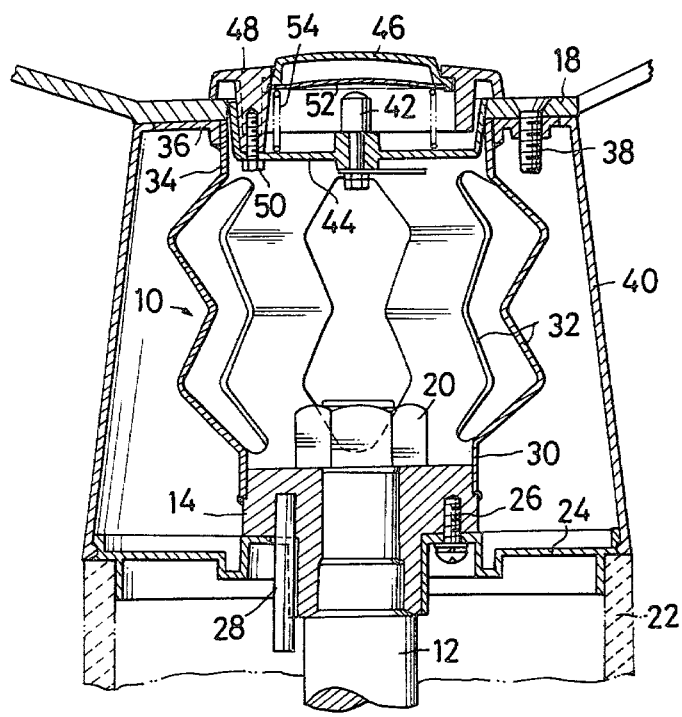

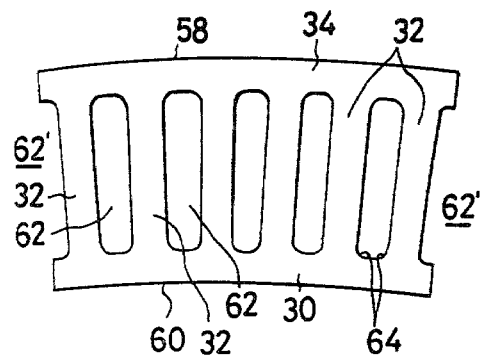
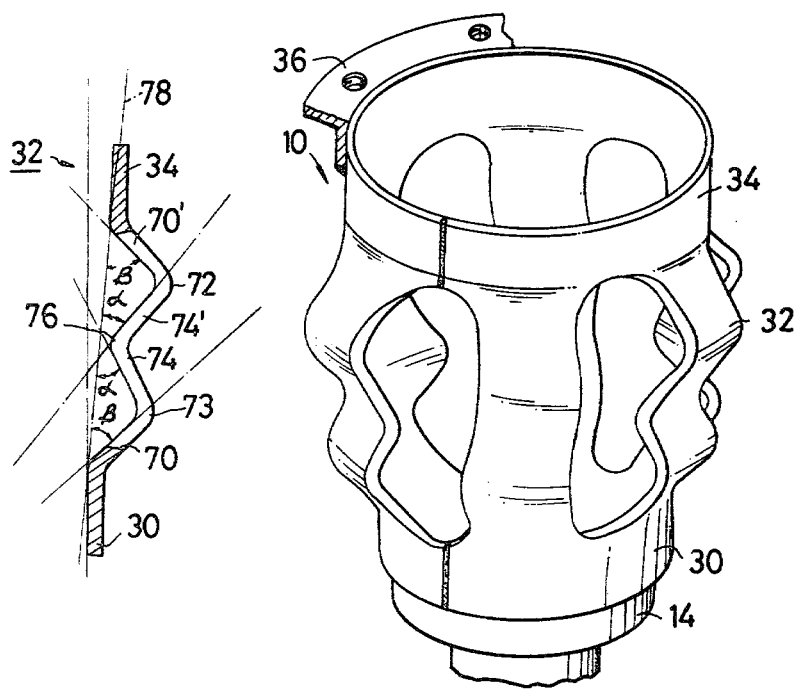

SHOCK ABSORBER

BACKGROUND OF THE INVENTION

This invention relates to device for absorbing shocks which may be imparted to the driver of a vehicle by a collision or the like, and more particularly a shock absorber which is disposed between the steering post and the steering wheel to protect the driver of a vehicle from such a shock.

A variety of device for absorbing shocks which are caused by the collisions of vehicles have been proposed in the art to protect the drivers of the vehicles from injury or fracture of bones. In a typical example of such devices, a steering wheel is provided with a buffering member of soft synthetic resin placed over the core metal. However, only with the buffering member, no buffering effect can be obtained when an impact force greater than 600 kg is imparted thereto. In another example, the steering post supporting the steering wheel is contracted in the axial direction by means of an elastic element, a frictional element or a buckling element, so that the steering wheel is moved down to absorb the impact energy. However, the example is also disadvantageous in that the distance for which the steering wheel can move down is limited, and therefore it is impossible to completely absorb the impact energy without injuring the human body or the driver.

SUMMARY OF THE INVENTION

Accordingly, a first object of this invention is to provide a shock absorber in which supporting elements adapted to support a steering wheel on a steering post are slightly elastically strained by the impact energy which may be caused by torsional load or quick stops during the ordinary running of a vehicle but are restored, without affecting the steering operation, after the load is removed. However, the elements reach the yielding point when an impact load (250 to 550 kg) less than the impact load which may injure a driver is applied, and after passing the yielding point, the supporting elements are plastically deformed.

A second object of the invention is to provide a shock absorber in which a plurality of supporting elements are extended from upper and lower cylindrical holding rings, spaced equally from one another in parallel with the common axis of the holding rings, and extended radially outwardly, so as to uniformly absorb impact energy in a number of directions.

A third object of the invention is to provide a shock absorber in which each supporting element is bent radially outwardly and inwardly in the form of a wave, the tensile strength thereof is not increased by cooperation of them, and when a load higher than a certain value is applied, the supporting elements are further bent, the deformation of the supporting elements reflecting the applied load.

A fourth object of the invention is to provide a shock absorber in which each of a plurality of supporting elements extended between upper and lower holding rings is outside a line connecting the upper and lower ends of the supporting element, and is bent outwardly upon application of a load, so as to prevent the occurrence of danger such as the suspension of deformation which may be caused by engaging the supporting elements with one another under a load.

A fifth object of the invention is to provide a shock absorber in which each supporting element has first and second portions which are extended from upper and lower holding rings and bent outwardly, and third and fourth portion which are extended from the first and second portions, bent inwardly and joined together at the ends thereof, and in which the angle of each of the first and second portions with a line connecting the upper and lower ends of the supporting element is larger than the angle of each of the third and fourth portion with the line, so that when an impact force is applied, the first and second portions are further bent outwardly, and thereafter the third and fourth portions are further bent inwardly, whereby the existence against the load is maintained continuously thereby to prevent the steering wheel from being extremely bent instantly.

A sixth object of the invention is to provide a shock absorber in which each supporting element has reinforcing arcuate ribs at four corners adjacent to upper and lower holding rings, which ribs are intentionally provided in punching, so that even when the steering wheel is bent until the diametral direction thereof becomes in parallel with the direction of the steering post, the supporting elements are never broken off the upper and lower holding rings and accordingly the steering wheel is never broken off the steering post to protect the driver from injuries which may otherwise be caused by the protruded wheel post, and in which by the provision of the shock absorber, after the front part of the driver's body abuts against the surfaces of the displaced steering wheel, the steering wheel is displaced toward the steering post and therefore the driver's body is inclined towards the steering post, during which the steering wheel absorbs the impact energy, and therefore even after the occurrence of an accident the driver may be able to operate the displaced steering wheel.

The foregoing objects and other objects of the invention will become more apparent from the following detailed description and the appended claims when read in conjunction with the accompanying drawings in which like parts are designated by like numerals.

BRIEF DESCRIPTION OF THE DRAWINGS

In the accompanying drawings:

FIG. 1 is a perspective view, with parts cut aways, showing a shock absorber according to this invention, which is mounted between a steering wheel and a steering post;

FIG. 2 is an enlarged sectional view of the shock absorber shown in FIG. 1, showing the mounting of the shock absorber;

FIG. 3 is a view of the shock absorber which is obtained by punching a sheet of metal plate;

FIG. 4 is a side view of a supporting element of the shock absorber; and

FIG. 5 is a perspective view of the shock absorber according to the invention, with the related components cut away.

DETAILED DESCRIPTION OF THE INVENTION

A shock absorber of a steering wheel, as shown in FIGS. 1 and 2, has its upper end portion fixedly secured to a boss 14 at the top of a steering post 12 and its lower end portion fixedly secured to a hub 18 integral with the arm of a steering wheel 16. The upper end portion of the steering post 12 has shoulders smaller in diameter and is serrated, so that the boss 14 is fixedly mounted on the shoulders with a nut 20 screwed on the upper end portion. The boss 14 is a conventional one having a protrusion smaller in diameter at the lower end. Cylindrical column 22 is provided with a disk-shaped separating plate 24 covering the top end face of the cylindrical column 22. The disk-shaped separating plate 24 has an inner flange into which the aforementioned protrusion of the boss 14 is inserted, and the boss 14 is fixedly secured to the separating plate 24 with screws 26. A cancel pole 28 and other necessary auxiliary components are mounted in the upper portion, larger in diameter, of the boss 14; however, the diameter thereof is reduced to the extent that the mechanical strength is not affected thereby.

The shock absorber 10 has a lower holding ring 30 forming the lower end portion thereof. The lower holding ring 30 is welded to the outer wall of the boss 14. A plurality of holding elements 32 are extended to an upper holding ring 34 forming the upper end portion of the shock absorber 10, and a flange 36 is welded to the outer wall of the upper holding ring 34. The flange 36 is secured to the hub 18 with screws circumferentially equally spaced from one another.

A decoration cover 40 is interposed between the outer peripheral edge of the hub 18 and the outer peripheral edge of the separating plate 24, for protection of the shock absorber 10. The decoration cover is made of soft synthetic resin in the form of a truncated circular cone.

In FIG. 2, reference numeral 44 is a stationary member in the form of a cup on which the stationary contact of a horn switch is provided. The outer wall of the stationary member 44 is fixedly secured to the inner peripheral edge of the hub 18. A horn button 46 is vertically movably inserted in a frame member 48, which is in turn inserted into the opening or hole of the hub 18 from above. The frame member 48 is fixedly secured to the bottom of the cup-shaped stationary member 44 with screws 50 circumferentially equally spaced from each other. An electrically conductive contact piece 52 is engaged with the lower end face of the horn button 46, but is energized upwardly by a coil spring 54. Thus, when the horn button is depressed the members 42 and 52 are brought into contact with each other to complete the electrical circuit of the horn, to operate the latter.

The above-described shock absorber 10 is made of one sheet of metal plate. In this example, it is made by cutting a steel plate and bending it. The steel plate is of the SPCC Standard, and the thickness is 1.6 to 2.6 mm, preferably of the order of 2.0 mm so that its brittleness is not increased by welding. More specifically, the shock absorber 10 is made of a flat plate 56 which is shaped as shown in FIG. 3. The configuration of the flat plate 56 is such that the wall of an inverted truncated circular cone is developed flat, because the diameter of the opening of the hub 18, in which the horn switch is provided, is larger than that of the existing boss 14. However, if the horn switch is modified to a size, then it is possible to make the opening in the hub smaller. Accordingly, in that case, the developed steel plate 56 may be rectangular with the upper and lower holding rings 30 and 34 equal in diameter. This also falls in the spirt and scope of this invention.

The developed steel plate 56 is cut by pressing out of a sheet of steel plate. More specifically, the steel plate is cut along two arcs different in radius with one common center (not shown), the two arcs corresponding to the upper and lower edges 58 and 60 of the plate 56 in FIG. 3, respectively. Furthermore, five (for instance) elongated holes 62 are formed radially at equal intervals in the plate 56 and first and second halves 62' of another elongated hole 62, which are obtained by cutting the elongated hole 62 radially, are formed in both end portions of the plate 56, respectively, with the upper and lower end portions corresponding to the upper and lower holding rings 30 and 34 being left. In this connection, it should be noted that the elongated holes 62 are cut so that the width of each holding element 32 is equal from top to bottom. Furthermore, it is essential that formation of the elongated holes 62 is carried out so the holding elements 32 are broken at the upper and lower while being bent. For this purpose, four corners of each elongated hole 62 are made arcuate, or provided with reinforcing ribs or fillets 64. In order that a right circular cylinder if formed by welding the right and left (as viewed in FIG. 3) ends of each of the upper and lower end portions corresponding to the upper holding rings 30 and 34, the right and left end portions of the upper holding ring 30 are contracted from the radii described thereto from the center, while the right and left end portion of the lower holding ring 34 are extended from the radii.

In the above-described shock absorber, six supporting elements 32 are provided; however, if the supporting elements are so designed that they can be deformed or bent in any direction in response to any intricate shock, then the number of supporting element may be three.

The developed, or flat, steel plate 56 is bent by using a die set in such a manner that its section is in wave form or bellows form as shown in FIG. 4. The plan view of the female mold of the punching machine is as shown in FIG. 3. Accordingly, a pair of arcuate grooves orthogonal with the supporting elements 32 are formed in the female mold. The male mold corresponds in configuration to the arcuate grooves. The steel plate is punched by the male and femal molds to have the aimed configuration.

Thereafter, the steel plate thus treated is formed into a cylinder by using a second die set and a bending jig on a hammering machine to take the form shown in FIG. 5.

In the second die set, two hammering stands are provided at both ends thereof. The hammering stand have widths equivalent to those of the holding rings 30 and 34 and arcuate surfaces with the same radii as those of the holding rings, and the portion of the second die set between the two hammering stands is recessed so that the passage of the bent supporting elements is not obstructed thereby. First end portions of the holding rings 30 and 34 are placed on the two hammering stands, respectively. Then, the holding rings 30 and 34 are curved by being hammered by the bending jig into cylinders while being continuously slid on the hammering stands. Thereafter, both ends of each of the holding rings 30 and 34 are welded together, and then the outer wall of the upper holding ring 34 is welded to the inner wall of the flange 36 as shown in FIG. 2.

The wavy supporting elements 32 will be described in more detail with reference to FIG. 2. As shown in FIG. 4, each supporting element 32 has first and second portions 70 and 70' which are extended from the inner edges of the holding rings 30 and 34 and bent outwardly, respectively. The first and second portions 70 and 70' are continued to third and fourth portions 74 and 74', respectively, which are bent inwardly at the ends 73 and 72 of the first and second portions 70 and 70', respectively. The third and fourth portions 74 and 74' are joined together as indicated by 76 in FIG. 4. The joint 76 is slightly radially outside a (phantom) chain line 78 connecting the upper and lower ends of the supporting element. More specifically, the angle $\beta$ of each of the first and second portions 70 and 70' with the chain line 78 is slightly larger than the angle $\alpha$ of each of the third and fourth portions 74 and 74' with the chain line.

That is, the shock absorber is so shaped that, when load or shock is applied thereto, the first and second portions 70 and 70' are bent further outwardly, and then the third and fourth portions 74 and 74' are bent further inwardly to absorb the load. Since the supporting elements 32 are bent in the described order and direction, the supporting elements are never engaged with one another, and the tensile strength thereof against load is not increased.

It is unnecessary to excessively bend the supporting elements 32 in manufacturing the shock absorber; however, it is necessary that at least the joint 76 is not radially inside the chain line 78, due to the following reason: As the first and second portions 70 and 70' have been bent radially outwardly of the holding rings which are relatively rigid, they can be readily bent outwardly, and furthermore each supporting element is, in its entirety, outside the chain line.

It goes without saying that the yielding point of the holding elements against load can be changed by controlling the thickness, width and material thereof.

What is claimed is:

1. A shock absorber comprising: a lower holding ring integral with a boss to be fixedly mounted on a steering post; an upper holding ring adapted for connection to a steering wheel hub; and a multiplicity of supporting elements connected to and extending axially between said upper and lower holding rings, said supporting elements being equally spaced about the circumference of said upper and lower rings, said elements each including a first portion connected to said upper ring and extending outwardly from a line between said upper and lower holding rings at a first angle, a second portion connected to said lower ring and extending outwardly from said line at an angle equal to said first angle, third and fourth intermediate portions connected at one of their ends to said first and second portions, respectively, and extending inwardly towards said line, said third and fourth portions being joined together at their other ends opposite said first and second portions, the joined ends of said third and fourth portions lying radially outwardly of said line, said third and fourth portions extending at a second angle to said line, said second angle being less than said first angle whereby said first and second portions bend radially outwardly on axial loading before said third and fourth portions bend radially inwardly.

2. The shock absorber of claim 1 wherein said rings and supporting elements are metal.

3. The shock absorber of claim 1 wherein opposite ends of said supporting elements have rounded fillets where said supporting elements join said rings.

4. The shock absorber of claim 1 wherein said rings and supporting elements are soft steel having a thickness of about 1.6 mm to 2.6 mm.

5. The shock absorber of claim 1 wherein said supporting elements are of equal width.

* * * * *